No. 798,386. PATENTED AUG. 29, 1905.
S. F. BAKER.
FAUCET.
APPLICATION FILED MAR. 30, 1905.

WITNESSES:
F. A. Parron.
M. A. Schmidt.

Sidney F. Baker, INVENTOR
BY
Milo B. Stevens & Co. ATTORNEYS.

UNITED STATES PATENT OFFICE.

SIDNEY F. BAKER, OF SANTA BARBARA, CALIFORNIA.

FAUCET.

No. 798,386. Specification of Letters Patent. Patented Aug. 29, 1905.

Application filed March 30, 1905. Serial No. 252,834.

*To all whom it may concern:*

Be it known that I, SIDNEY F. BAKER, a citizen of the United States, residing at Santa Barbara, in the county of Santa Barbara and State of California, have invented new and useful Improvements in Faucets, of which the following is a specification.

My invention relates to a syrup-faucet for soda-water apparatus, and has for its object to provide a faucet with automatic and instantaneous action, efficient and clean in operation, and embodying simplicity and cheapness of construction.

A further object is to provide a faucet which will pass fruit-pulp syrup and that can be effectually and easily regulated so that from a few drops to a large quantity can be readily controlled and instantly drawn.

Figure 1:
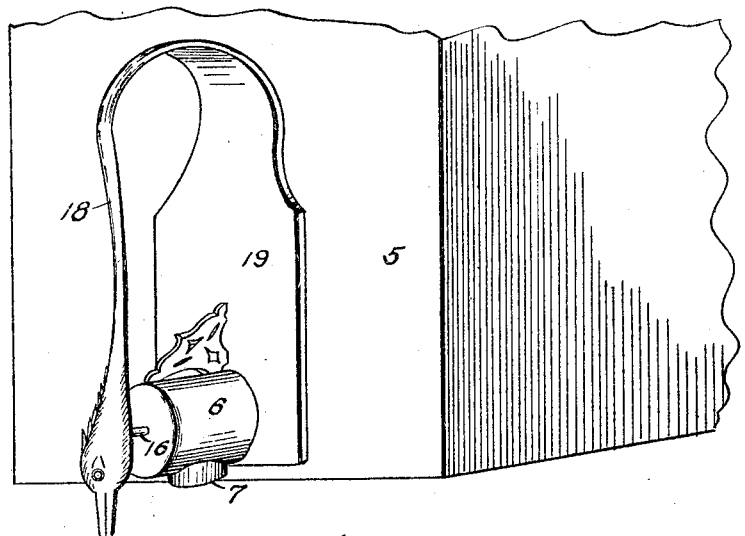
Figure 2:
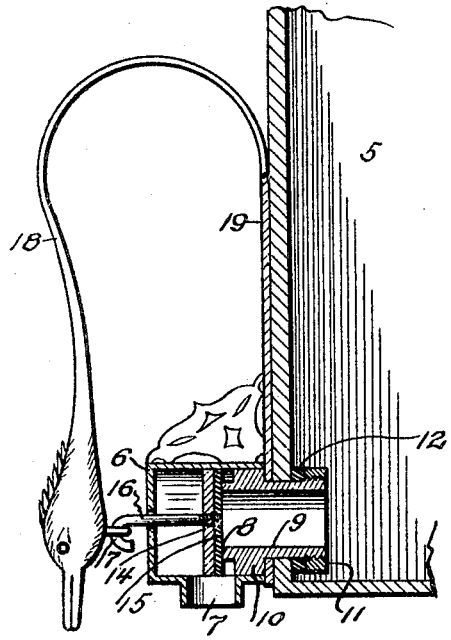

In the accompanying drawings, Figure 1 is a perspective view of the invention. Fig. 2 is a vertical section thereof.

Referring specifically to the drawings, 5 denotes the syrup tank or can. The faucet comprises a cylindrical casing 6, having an outlet-spout 7. Inside of the casing a valve-seat 8 is formed on the outer end of a tubular plug 9, fitting in the casing. The plug is formed with an enlargement or collar 10 and extends through the wall of the syrup-tank, its inner end being threaded to receive a nut 11, whereby it is secured to the tank. A washer 12 is placed between the nut and wall of the tank. The casing 6 telescopes or slides snugly over plug 9.

The valve comprises a disk 14, having its face fitted with a washer 15, of rubber or other elastic material, both screwed on a stem 16, which extends from the closed front end of the casing 6, the other end being open, and has at its outer end a hook 17, whereby it is secured to the operating device. This device comprises a spring-arm 18, which is integral with and extends outwardly from a plate 19, secured to the tank 6. The collar 10 of the plug 9 bears on the plate, so that when the nut 11 is tightened up the plate will be securely clamped to the tank. The plate is apertured to permit the parts already described to be attached.

The spring-arm normally holds the valve seated on the outer end of the plug 9, and said valve is unseated by taking hold of the spring-arm and pulling it outwardly. When the spring-arm is released, the valve instantly seats itself. The area of the valve-seat is less than that of the valve, so that the latter will always be squarely seated and a clean and perfect shut-off is had and leakage is prevented.

When the washer 15 becomes worn, it can be readily removed and replaced. The spring-arm will be suitably ornamented, as shown in the drawings.

A faucet constructed as herein described is simple and cheap, and is instantaneous in its action of releasing and stopping the flow of syrup. It will pass syrup containing fruit-pulp, and the quantity to be drawn can be readily regulated. The faucet is perfectly clean in its action and does not drip, and any of its parts can be readily replaced, if desired.

Having thus described my invention, what is claimed as new, and desired to be secured by Letters Patent, is—

1. A faucet comprising a casing having an outlet and containing a tubular plug; a valve seating on the outer end of the plug; and a spring-arm serving as a handle to operate the valve and normally holding the same seated.

2. The combination with a receptacle, of a faucet comprising a casing; a tubular plug in the casing and extending through the wall of the receptacle; a valve seating on the outer end of the plug; a plate having a projecting spring-arm serving as a handle to operate the valve and normally holding the same seated; a collar on the plug and bearing on the plate; and a nut screwed on the inner end of the plug for clamping said plug and the plate to the wall of the receptacle.

In testimony whereof I have signed my name to this specification in the presence of two subscribing witnesses.

SIDNEY F. BAKER.

Witnesses:
B. E. BAKER,
C. A. CARRILLO.